US011196289B2

(12) United States Patent
Allahut (10) Patent No.: US 11,196,289 B2
(45) Date of Patent: Dec. 7, 2021

(54) METHOD FOR OPERATING AN ELECTRICAL SYSTEM HAVING A PLURALITY OF ELECTRICAL LOADS, POWER SUPPLY UNIT, AND ELECTRICALLY OPERATED SYSTEM

(71) Applicant: Siemens Aktiengesellschaft, Munich (DE)

(72) Inventor: Gerd Allahut, Greding (DE)

(73) Assignee: Siemens Aktiengesellschaft, Munich (DE)

( * ) Notice: Subject to any disclaimer, the term of this patent is extended or adjusted under 35 U.S.C. 154(b) by 1 day.

(21) Appl. No.: 16/495,712

(22) PCT Filed: Mar. 21, 2018

(86) PCT No.: PCT/EP2018/057128
§ 371 (c)(1),
(2) Date: Sep. 19, 2019

(87) PCT Pub. No.: WO2018/172397
PCT Pub. Date: Sep. 27, 2018

(65) Prior Publication Data
US 2020/0099250 A1    Mar. 26, 2020

(30) Foreign Application Priority Data
Mar. 21, 2017    (EP) .................................... 17162168

(51) Int. Cl.
*H02J 9/06*    (2006.01)
*H02J 13/00*    (2006.01)
*G05B 19/042*    (2006.01)

(52) U.S. Cl.
CPC ............ *H02J 9/061* (2013.01); *G05B 19/042* (2013.01); *H02J 13/00006* (2020.01); *G05B 2219/25357* (2013.01); *G05B 2219/2639* (2013.01)

(58) Field of Classification Search
CPC .. H02J 9/061; H02J 13/000006; G05B 19/042
(Continued)

(56) References Cited

U.S. PATENT DOCUMENTS 5,894,415 A    4/1999 Habegger
10,599,199 B1 *    3/2020 De La Cropte De Chanterac ...... G06F 1/28
(Continued)

FOREIGN PATENT DOCUMENTS

EP    2787405    10/2014

OTHER PUBLICATIONS

Office Action dated Nov. 18, 2020 issued in European Patent Application No. 18716909.9.
(Continued)

*Primary Examiner* — Michael R. Fin
(74) *Attorney, Agent, or Firm* — Cozen O'Connor (57) ABSTRACT

A power supply unit, an electrically operated system and a method for operating an electrical system, wherein the power supply unit connects through a basic supply voltage or a buffer voltage, which is provided by an energy store unit, where to perform a controlled switch-on process of the electrical loads, a switch-on delay time is specified, after the expiration of which the basic supply voltage or the buffer voltage is connected through at the output of the power supply unit, and where to perform a controlled switch-on process of the electrical loads, a voltage is output only when a charge level of the energy store unit is greater than or equal to a threshold value of the energy store charge level such that
(Continued)

switch-on management for power supplies that ensures absolutely safe interruption-free and thus trouble-free start-up of a plurality of electrical loads is achieved.

18 Claims, 3 Drawing Sheets

(58) Field of Classification Search
USPC .............................................. 307/48, 64, 65
See application file for complete search history.

(56) References Cited

U.S. PATENT DOCUMENTS

| 2002/0138772 A1* | 9/2002 | Crawford | G06F 1/30 713/300 |
| 2017/0315817 A1* | 11/2017 | Pritchard | G06F 1/3287 |
| 2019/0052090 A1* | 2/2019 | Kobayashi | H02J 3/383 |

OTHER PUBLICATIONS

English: "APC Symmetra RM Installation Manual", pp. 1-64, XP055394964, Found on internet: URL:http://www.apc.com/salestools/ASTE-6Z6K6C/ASTE-6Z6K6C_R0_EN.pdf, found on Aug. 1, 2017, Installation Manual, p. 7, line 1-4, Installation Manual, p. 10, line 10-13, Installation Manual, p. 11, figure 5, Operation Manual, p. 13; 2001.

Schneider Electric: "User Guide—PowerChute(TM) Network Shutdown v4.2", pp. 1-71, XP055395072, found on internet: URL:http://www.apc.com/salestools/PMAR-9E5LVY/PMAR-9E5LVY_R4_EN.pdf, found on Aug. 1, 2017; 2016.

Schneider Electric: "User's Guide—UPS Network Management Card 2", AP9630, AP9631, APC by Schneider Electric, XP055141606, found on Internet: URL:http://www.jlab.org/Hall-D/Documents/manuals/APC stuff/AP9630 9631 UPS Network Management Card 2 User's Guide firmware, V5.1.1.pdf, found on Sep. 19, 2014, p. 2, line 1-4, p. 5, 26, 41, line 2-4, 44; 2009.

* cited by examiner

METHOD FOR OPERATING AN ELECTRICAL SYSTEM HAVING A PLURALITY OF ELECTRICAL LOADS, POWER SUPPLY UNIT, AND ELECTRICALLY OPERATED SYSTEM

CROSS-REFERENCE TO RELATED APPLICATIONS

This is a U.S. national stage of application No. PCT/EP2018/057128 filed Mar. 21, 2018. Priority is claimed on EP Application No. 17162168 filed Mar. 21, 2017, the content of which is incorporated herein by reference in its entirety.

BACKGROUND OF THE INVENTION

1. Field of the Invention

The invention relates to a method for operating an electrical system having a plurality of electrical loads, which are connected to at least one power supply unit and are supplied with a voltage by said power supply unit, where the power supply unit either connects through a basic supply voltage or, in the case of failure of the basic supply voltage, connects through a buffer voltage that is provided by an energy store unit.

The invention also relates to a power supply unit, which is configured to perform the method, and to an electrically operated system for performing the method and to a computer program.

2. Description of the Related Art

In many technical fields, such as in automation technology or building technology, a fail-safe power supply is a necessary prerequisite for the smooth operation of the technical system. In the event that the regular power supply breaks down, as a result of malfunctions in the mains supply in a technical system, for instance, devices exist for a reliable power supply, which supply regulated output voltages both for direct voltages and also for alternating voltages.

In the event of a mains failure, interruption-free power supplies can supply a load with energy for a certain period of time by reliable buffering through a connected energy store (i.e., buffer mode). The interruption-free power supplies accordingly supplement existing mains units for interruption-free rated currents from battery modules or other energy stores.

In machines or system components that require a certain period of time to power up and power down their operational readiness, and which are not permitted to be switched off during this period of time because damages, restrictions in operational readiness, data loss or a hindered re-commissioning may otherwise result, an interruption-free powering-up should also be ensured in addition to a reliable operation. Examples of such machines or system components are personal computers (PCs), in particular industrial PCs, which control and/or monitor technical systems, but also machines with rotating parts, in which a certain rotational speed must first be reached before they are fully operationally ready or also thermodynamic machines that must first be preheated or cooled down before they are fit for use.

Even an interruption-free power supply that has a buffer mode on account of a connected energy store cannot ensure the frictionless operation with brief consecutive breakdowns in the supply voltage, if in the interim the energy store is used up. Inconsistencies and data losses may result. When a PC/machine is restarted, because, due to a previous breakdown in the regular supply voltage, the PC/machine already had to be buffered and the energy store charge level reduced as a result, the resistance to interruption of an interruption-free power supply was previously not yet taken into consideration. If, at the point in time of the restart, there is no adequate resistance to interruption, with a renewed breakdown of the regular supply voltage, then this would indicate the PC crashing or the sudden idling of the machine when being powered up. A maximum downtime on account of a complicated re-commissioning, data loss and damages to machines and workpieces result.

Even with standard power supplies without a connected energy store, which cannot therefore operate in buffer mode, a resistance to interruption or interruption freedom would be desirable.

SUMMARY OF THE INVENTION

In view of the foregoing, it is therefore an object of the invention to provide an improved method for the reliable operation of a technical/electrical system, which is connected to a power supply unit so that an interruption-free powering-up of the components of the technical system is particularly ensured. It is also the object of the invention to provide a corresponding power supply unit and an electrically operated system with power supplies of this type.

These and other objects and advantages are achieved in accordance with the invention by a method for operating an electrical system having a plurality of electrical loads, which are connected to at least one power supply unit and are supplied with a voltage by the power supply, where the power supply unit either connects through a basic supply voltage or in the case of failure of the basic supply voltage connects through a buffer voltage that is provided by an energy store unit. In accordance with the invention, a switch-on delay time is predetermined in order to perform a regulated switch-on process of the electrical loads, after the expiry of which either the basic supply voltage or the buffer voltage is connected through at the output of the power supply unit. In accordance with the invention, in order to perform a regulated switch-on process of the electrical loads, a voltage is output at the output of the power supply unit only when a charge level of the energy store unit is equal to or greater than a threshold value of the energy store charge level. In this way, switch-on management for power supplies is achieved, which either takes into account a switch-on delay time selected by the user or which controls the switching-on of the power output of a power supply unit as a function of an energy store charge level, or which shows a combination of switch-on delay time and energy store charge level so that a fail-safe interruption-free and thus trouble-free power-up or trouble-free power-up of a plurality of electrical loads is ensured.

The advantages achieved with the invention consist in particular in significantly improved data and system safety and a frictionless restart of an electrical load, such as a PC/machine being ensured compared with a conventional interruption-free power supply unit, even if the regular supply voltage repeatedly breaks down successively at short time intervals. In this way, at the time of restarting a PC/machine the user is now certain that the power output of the power supply is only actually switched on after the conditions determined by the user himself have been met and as a result the PC/machine is brought back into operation. The potential of PC/machine restarts failing is therefore ruled out.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and its embodiments and further advantages is described and explained in more detail below on the basis of the figures, in which exemplary embodiments of the invention are shown, in which.

DETAILED DESCRIPTION OF THE EXEMPLARY EMBODIMENTS

Figure 1:
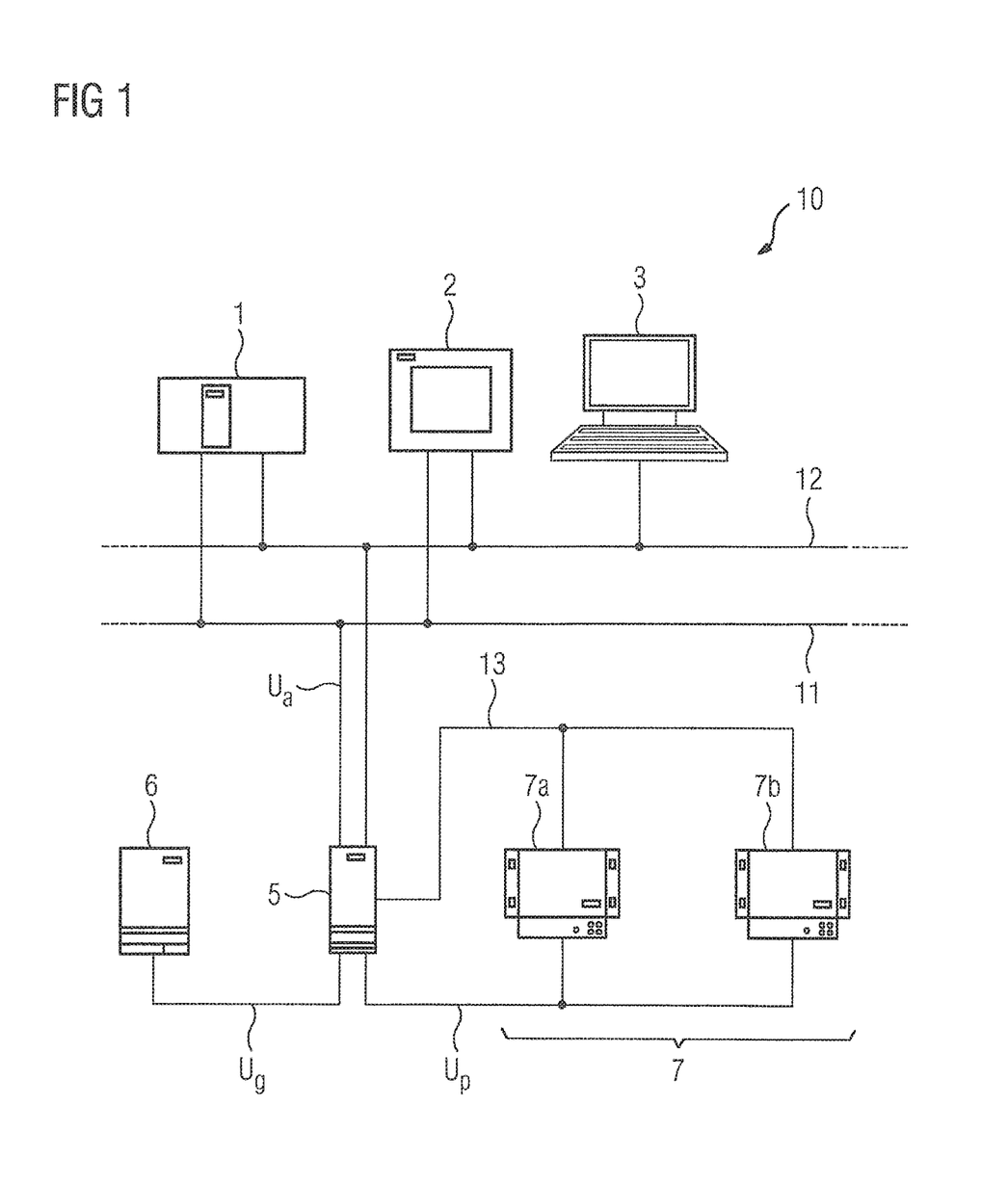
FIG. 1 shows a schematic diagram of an electrical system having electrical loads and an interruption-free power supply unit, which are connected to energy store units in accordance with the invention.

One embodiment variant of an electrically operated system 10 with at least one power supply unit and with a plurality of electrical loads 1, 2 or 3 is shown in FIG. 1. The system 10 can be part of an automation system or serve as the power supply for production machines and other assemblies, machines and systems, in which a controlled, possibly interruption-free power supply is needed for reliable operation. By way of example, industrial PCs 1 and 2 and a conventional PC 3 should be shown here as loads, which are typically used to control, operate and observe, to configure or monitor a technical system.

In order to be able to operate industrial PCs or controllers, a 24V direct current is typically required. In order to obtain a 24V direct current, the alternating current (in Europe 230 V) supplied by the network is converted with an AC/DC converter. This AC/DC converter is typically accommodated in a standard power supply 6, which supplies a basic supply voltage Ug (here in the form of 24 V direct current). One such standard power supply is, however, not able to cover interruptions in the basic supply voltage. The standard power supply 6 for supplying a basic supply voltage Ug is typically formed as an individual module.

In order to make the system more failsafe, an interruption-free power supply is used. One such interruption-free power supply unit 5 is shown in FIG. 1. The interruption-free power supply 5 here receives the direct current from the standard power supply 6 and connects it through to the connected loads 1, 2, 3. In this case, unit 5 has an integrated direct current-direct current converter (DC/DC converter). The power supply unit 5 achieves interruption freedom via the connected energy store unit 7 for supplying a buffer voltage Up. The power supply unit 5 has an electronics system, which ensures that it is possible to toggle interruption-free between the basic supply voltage Ug and the buffer voltage Up. Here the power supply unit 5 cannot only supply the loads (e.g., a PC or a machine) with energy for a specific amount of time (i.e., buffer mode), but can also register the buffer mode with the PC or the machine controller, which enables the PC (e.g., via retrieving a batch file) or the machine (by way of the control program) to completely power down and end running programs, close databases without data loss and subsequently power down the operating system/machine. This ensures data and system safety and the frictionless restart of the PC/machine, if the regular supply voltage is to be reestablished.

In the exemplary embodiment shown in FIG. 1, the loads 1, 2 and 3, which may be present in any number, are connected via a supply network 11, for supplying with electrical energy, and optionally via a communication network 12, such as an industrial Ethernet, to the interruption-free power supply unit 5. If no interruption-free power supply is required in a system, then the networks 11 and optionally 12 are connected directly with the standard power supply 6 for supplying the basic supply voltage Ug.

The energy store unit 7 comprises any number of battery modules 7a, 7b, . . . . The battery modules can be based on maintenance-free lead batteries, temperature-sensitive pure lead batteries, long-lasting lithium batteries or on a capacitor technology, for instance. In the presence of an energy store unit 7, failure of a source 6 providing a basic supply voltage Ug can be bridged for a period of time tp via a buffer voltage Up, which is supplied by the energy store unit 7.

A power supply unit 5 or a standard power supply 6 has at least one power output for the desired output voltage Ua or the desired current and can have one or also more communication outputs, such as a USB port or an Ethernet/Profinet interface. Depending on use, power supply units 5 or 6 also exist, which are not connected to a communication network 12 or have absolutely no communication interface and which are only to be controlled via the locally installed firmware.

An interruption-free power supply unit 5, as shown in the exemplary embodiment in FIG. 1, in addition to the outputs, has at least two voltage inputs, a first input for the basic supply voltage Ug and a second input for the buffer voltage Up. The buffer voltage can optionally be controlled via the communication connection 13. The state of the energy store modules or their charge level can also be communicated to the power supply unit 5 via such a communication link 13, if available. Therefore, during operation of the electrical system 10, account must be taken of the fact that battery modules require a specific period of time for charging. In the instances in which a controlled switch-on or switch-off process of the loads 1, 2, 3 is to be ensured, it may be advantageous to determine an energy store charge level. The energy store charge level is frequently determined based on characteristic curves supplied by the battery manufacturer and as a function of age, temperature and charge state of the battery modules.

The PC/machine is electrically connected to the power output of the power supply unit 5. The restart of the PC/machine always occurs immediately if the regular basic supply voltage Ug is present at the power input of the power supply unit 5 and as a result the power output of the power supply unit 5 is immediately switched on, which in this case supplies the output voltage Ua=Ug. In buffer mode, the power supply unit 5 connects through the buffer voltage Up supplied by the battery modules of the energy store unit and the output voltage Ua=Up is applied. Here, the power supply unit 5 does not consider whether the energy store is sufficiently charged. A renewed breakdown of the regular basic supply voltage can possibly not be bridged entirely. It should be noted that whenever the basic supply voltage Ug is present, the battery modules of the energy store unit are also charged at the same time.

Under the afore-cited conditions, in order to now ensure a regulated switch-on process of the electrical load 1, 2, 3, . . . , various embodiments are proposed in accordance with the invention: A switch-on management for power supplies, which either takes into account a switch-on delay time selected by the user (i.e., delay time-dependent switch-on management) or which controls the switching-on of the power output of a power supply unit as a function of an energy store charge level (i.e., energy store charge level-dependent switch-on management). With power supplies with a connected energy store, as shown in FIG. 1, further embodiment, which represent a mixture of delay time-dependent switch-on management and energy store charge level-dependent switch-on management, can also be used.

The delay time-dependent switch-on management is the embodiment in which the user prespecifies or configures a specific switch-on delay time tv. After the switch-on delay time has elapsed, either a basic supply voltage Ug or a buffer voltage Up is present at the output of the power supply unit 5 of the exemplary embodiment shown in FIG. 1. The delay time-dependent switch-on management can also be implemented with power supplies without energy store, i.e., with non-interruption-free power supplies.

The energy store charge level-dependent switch-on management is the embodiment in which the user prespecifies or configures a threshold value SW for a charge level LN of the energy store unit 7. After reaching this threshold value SW, i.e., when the charge level LN of the energy store unit is equal to or greater than the predetermined threshold value, either a basic supply voltage Ug or a buffer voltage Up is present at the output of the power supply unit 5 of the exemplary embodiment shown in FIG. 1. Here, the threshold value is preferably selected as a percentage of the maximum charge state of the battery modules. Alternatively, a charge time t1 of the energy store unit 7 can also be determined, while the charging of the energy store unit 7 is performed with a charging current up to the desired threshold value of the energy store charge level. A user could then predetermine a desired charging time, which must however be selected such that adequate charging of the energy store unit is ensured.

With the configuration of the energy store charge level-dependent switch-on management, which is suited to interruption-free power supplies with a connected energy store unit, the user must give considerably less consideration than is the case with the time-delayed switch-on management that does, however, have the advantage that it is also suitable for power supplies without an energy store unit, in other words for standard power supplies. The use of an interruption-free power supply, which offers both a time delay and also consideration of the charge level of the energy store unit, will certainly ensure the greatest reliability of a switch-on management.

FIGS. 2*a*-2*d* show various embodiments of a switch-on management for power supplies without and with a connected energy store unit, where in many instances a combination of time-delayed and energy store charge level-dependent switch-on management is present. The functions of the output voltage Ua of any power supply unit are plotted as a function of the time t.

Figure 2A:
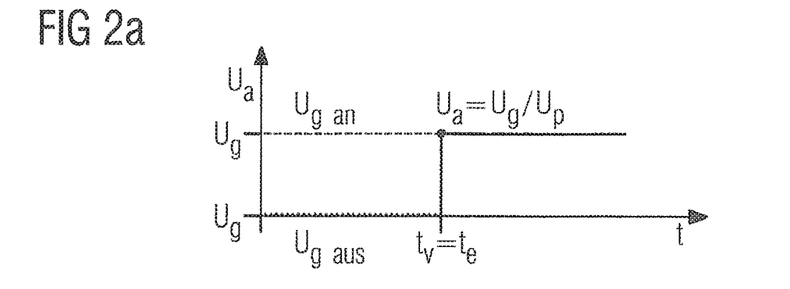
FIG. 2a to FIG. 2d show various embodiment of the switch-on management in accordance with the invention.

In FIG. 2*a*, the simplest case is shown, in which after the time span tv has elapsed, a voltage Ua is present at the output of the power supply unit 5. The switch-on time instant te of the load corresponds here to tv. Here, it is irrelevant how the situation looks before switch-on. Without an energy store unit, the basic supply voltage Ug can be present at the input of the power supply unit even before te or the basic supply voltage Ug is first connected through at time instant te=tv in accordance with a step function. The voltage is connected through with energy store unit at time instant te, which is currently present at the input of the power supply unit 5; this can either involve the basic supply voltage Ug or the buffer voltage Up. However, this embodiment is disadvantageous if no energy store unit is available and no basic supply voltage Ug is available precisely at time instant te=tv.

Figure 2B:
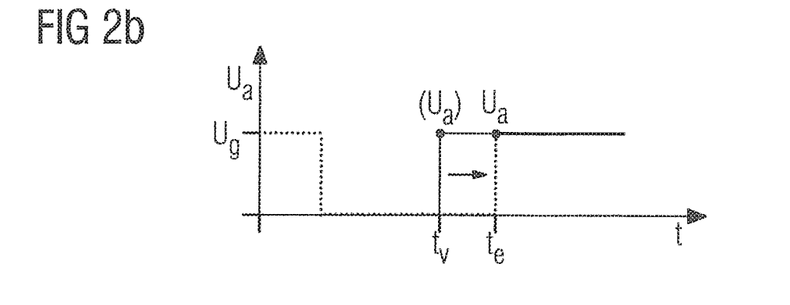

In FIG. 2*b*, an embodiment of the time-delayed switch-on management is shown, in which the previously set time delay tv is extended until switch-on time instant te, when a specific condition is fulfilled. With this embodiment, the possibility of failure of the basic supply voltage is taken into consideration during the predetermined switch-on delay time tv.

In accordance with the disclosed embodiments of the invention, there is provision in one embodiment for an extension of the switch-on delay time tv up to time instant te, at which the basic supply voltage Ug is available again for through-connection. This embodiment is in particular useful for power supply units without an energy store unit. Power supply units with a connected energy store unit (as shown in FIG. 1) are supplied with the charge time t1 lost as a result of the failure of the basic supply voltage Ug by extending the switch-on delay time tv up to time instant te, where the charge time t1 is required as a minimum to charge the energy store unit sufficiently. For power supply units with a connected energy store unit (as shown in FIG. 1), a charge level LN of the energy store unit can also additionally be checked and the buffer voltage Up can only be connected through as a function of the charge level LN. Alternatively, an output voltage Ua can only then be available if the charge level of the energy store unit has reached a threshold value. In this case, at switch-on time instant te, both Ug or Up can be connected through. In this regard, it has been taken into account that the energy store unit can only be charged if the basic supply voltage Ug is available. This embodiment would thus cover the instance in which the basic supply voltage breaks down shortly before reaching a specific charge level of the energy store. In this case, the switch-on process would be delayed until a "safe" charge level is reached, which can provide a buffer voltage Up for a sufficiently long period of time.

Figure 2C:
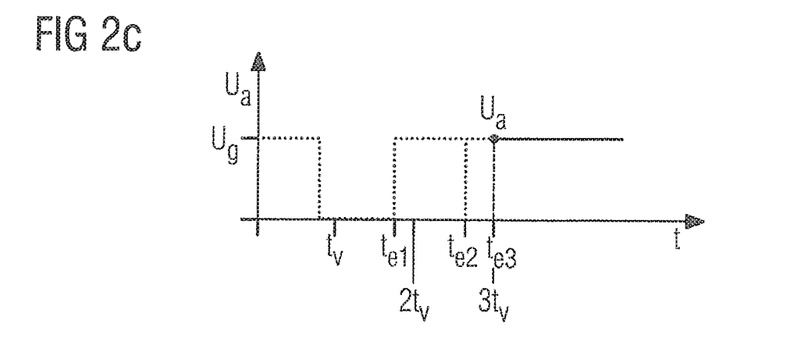

In FIG. 2*c*, an embodiment of the time-delayed switch-on management is shown, in which the previously set time delay tv is repeated so often until a specific condition is fulfilled. With this embodiment, the possibility of failure of the basic supply voltage is taken into consideration during the predetermined switch-on delay time tv.

In one variant of this exemplary embodiment, if the basic supply voltage Ug fails, the switch-on delay time tv is repeated until the basic supply voltage Ug is available again (te1 in FIG. 2*c*) or alternatively the basic supply voltage Ug has made available at least one complete switch-on delay time tv (te3 in FIG. 2*c*). The output voltage Ua can then be output at the output of the power supply unit either immediately in the presence of the basic supply voltage Ug (at time instant te1 or te2 in FIG. 2*c*) or however only after a multiple of the switch-on delay time n*tv has elapsed at time instant te3, wherein n is any number>1. This embodiment is also useful particularly for power supply units without an energy store unit. For power supply units with a connected energy store unit (as shown in FIG. 1), a charge level LN of the energy store unit can additionally be checked and the buffer voltage Up at time instants te1 (if the charge level is sufficiently high) or te2 (only after a multiple of the switch-on delay time n*tv has elapsed) can only be connected through with a sufficiently high charge level as a function of the charge level LN. This is particularly well suited for instance for synchronizing the loads 1, 2, 3. Alternatively, in this exemplary embodiment, the energy store unit can firstly also charge and only after a threshold value of the charge level of the energy store unit has been reached at the output of the power supply unit will a voltage Ua=Ug or Ua=Up be switched on at time instants te1, te2 or te3.

Figure 2D:
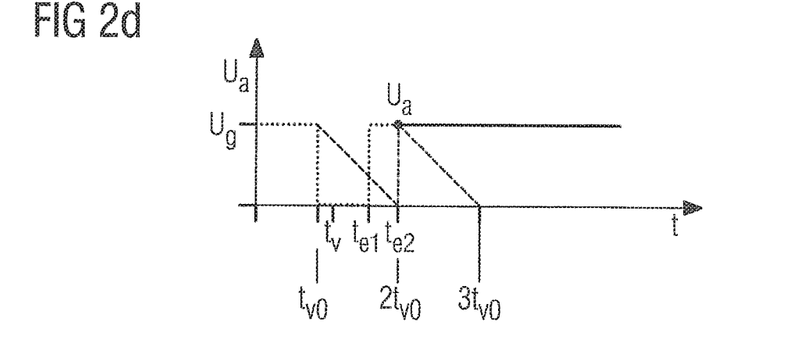

FIG. 2d shows an embodiment of the time-delayed switch-on management, in which, in the case of failure of the basic supply voltage Ug during the predetermined switch-on delay time tv, the switch-on delay time tv begins to run again from the time instant of the failure of the basic supply voltage Ug and is thus repeated so often until d) the basic supply voltage Ug has made available at least one complete switch-on delay time tv.

In FIG. 2d, the basic supply voltage Ug is switched on at the start of the time axis. At time instant tv0, which is ahead of the set delay time tv, the basic supply voltage Ug breaks down again. The time delay time is now as it were reset to 0 and begins to run again (Countdown) and repeats so often (2tv0, 3tv0 in FIG. 2d) until one of the afore-cited conditions a) to d) is fulfilled. At switch-on time te1 or te2, the power supply voltage either connects through the basic supply voltage Ua=Ug or the buffer voltage Ua=Up, if the charge level LN of the energy store unit is sufficiently high or a threshold value of a charge level LN of the energy store unit is exceeded. The switch-on time te1 is selected as soon as one of the voltages Ug or Up (with a sufficient charge level) is available. The switch-on time te2 is selected when one of the voltages Ug or Up is to be present at the output of the power supply unit only after a multiple n (n=natural number) of the delay time (of the Countdown) has elapsed (for instance, for synchronization purposes). It is also conceivable for the supplier only to be switched on at time 3t0, i.e., when the basic supply voltage Ug has made available at least one complete switch-on delay time tv.

For all previously described embodiment (described in FIGS. 2b, 2c, 2d), it applies that the charge level and threshold values, which ensure a reliable switching-on after extending, repeating or the countdown of the delay time, are predetermined by a user or also by an application in which empirical values are already stored, for instance. An application can naturally also continuously determine the required switch-on delay time. The application can adjust the switch-on delay time in a self-learning manner in order, e.g., by extending the delay time to respond to an ageing energy store or to changes on the PC/machine, or by shortening the delay time to respond to, e.g., a new energy store (as a result of which the old one has been replaced) or to changes on the PC/machine. With the continuous determination of the delay time, which is coupled to a condition monitoring of the energy store or even of the PC/machine, the optimal replacement time of the energy store can be determined and communicated via a reporting system to ensure the safe powering-up and powering-down of the PC/machine at a further point.

The switch-on management embodiments are preferably implemented as firmware in the power supply or however also as application software, e.g., as a software module on a processor in or outside of the power supply. As shown in FIG. 1, the power supply unit 5 can be connected to a communication network 12, like for instance an Industrial Ethernet, and can for this purpose generally have corresponding digital inputs and outputs, USB or Ethernet/Profinet interfaces. Consequently, multiple implementation possibilities result. The switch-on management application software can also be implemented on a host computer of a control system of a technical system, where the host computer communicates via the network 12 or other networks with the power supply and exchanges data. A connection to the Internet is also possible via a power link, as a result of which further realization embodiments result. For instance, the use of an IT infrastructure, such as Cloud computing, is then also possible. IT services, such as storage space, computing power or application software can then be used as a service via the Internet, for instance, and only a simple switching logic for the through-connection and connection of the corresponding voltages is present on the power supply unit. On account of the integration or communication link of the inventive power supply unit in or on PC-based systems, a simple configuration and monitoring, comprehensive diagnostic possibilities relating to the state of all components of the electrical system and a remote monitoring via an integrated web server is reached. Moreover, access to device configuration data and operational data, such as the currents and voltages, the charging current and battery current is possible (for instance, for condition monitoring of all components of the electrical system and in particular of the power supply unit and energy store).

In one embodiment, the engineering, i.e., the configuration of the switch-on management application software, can occur via an engineering software tool. With a network failure, the buffer voltage and the integration of the power supply into a network enable the power supplies also to be brought into a defined state independently of one another, such as in a time-delayed manner. For this purpose, function blocks, e.g., for the Siemens SIMATIC, are then available. By integrating the switch-on management application software into a higher-level engineering or automation system or also control system, the configuration or parameterization of any data, states, alarms, diagnostic information can be prescribed inherently in the system during the commissioning of a technical system and observed and visualized during ongoing operation. The corresponding device configuration (selection of the switch-on management embodiment and the entry of the desired delay time or the energy store charge level) can be transmitted here via an engineering tool to the power supply unit or performed directly via a web server of the power supply unit.

Both the delay time-dependent and also the energy level-dependent switch-on management also then function, if these are power supply units, which are not connected to a communication network (12, 13) or do not have a communication interface. Particularly for power supply units without a communication network/communication interface, it is particularly advantageous to comfortably set the desired embodiment of the delay time-dependent switch-on management manually by way of a switch, such as a rotary coding switch, directly on the power supply, provided that the switch-on management embodiments are implemented in the firmware of the power supply. The user then selects the relevant embodiment dependent on use.

However, the energy level-dependent switch-on management can also be used without a communication network/communication interface (communication networks 12 and 13), if the power supply unit 5 can measure the energy that has been taken from the energy store 7 during buffer mode. This energy must then be fed back again to the energy store 7 (or however at least the energy quantity to reach the switching threshold SW) before the power output is switched on again in order to ensure safe operation in accordance with the disclosed embodiments of the invention.

In addition, with an energy store charge level-dependent switch-on management, it is conceivable to fix it as a standard procedure in the firmware of the power supply.

With delay time-dependent switch-on management, a specific switch-on delay time is, as described, either predetermined manually by a user or via an engineering tool or a higher-level system. This period of time should be able to be set to be sufficiently large, i.e., a freely selectable period of time between one second and the maximum charge time of the energy store used (this can extend into hours). The switch-on delay time should be selected to be sufficiently large so that the energy store used and charged up to the discharge limit can be charged again up to a specific charge level or entirely, in order to ensure that the power-up time, e.g., of a PC/machine plus the power-down time of the PC/machine can be bridged by the energy store. The switch-on delay time is then always taken into account for the switching-on of the power output, if the regular supply voltage is present at the power supply but in the preceding operation a failure of the regular supply voltage is registered and a transition to buffer mode must be made that has triggered the powering-down of the PC/machine. It is absolutely conceivable to offer an additional option, which generally (in other words even in the absence of a buffer mode having to be present in the preceding operation of the power supply, which has triggered the powering-down of a PC/machine), is to await the switch-on delay when the power supply is to be operated further. The delay time-dependent embodiment could preferably be used if the operation of several machines always has to occur in synchrony, i.e., if a number of machines are dependent upon one another and above all on the same supply voltage and always have to be put into operation at the same time.

With the energy store charge level-dependent switch-on management, the energy store charge level decides when the power output of the power supply is switched on, when the regular supply voltage is present at the power supply, but during preceding operation failure of the regular supply voltage had been registered and a transition into buffer mode had to be made which has triggered the powering-down of a PC/machine. With the configuration of the pure energy store charge level-dependent switch-on management, a user must pay significantly less attention than with delay time-dependent switch-on management. However, it is also conceivable here to offer an additional option, which generally is to await the reaching of the set energy store charge level upon further operation of the power supply (even in the absence of a buffer operation having to be present in the preceding operation of the power supply, which has triggered the powering-down of the PC/machine). An application can naturally also continuously determine the energy required for the powering-up and powering-down of the PC/machine (here, the measuring of the energy can occur via the power supply unit itself or via a separate apparatus) and thus reestablish the energy store charge level required for the secured further operation and the associated switching threshold. The application can then adapt itself in a self-learning manner via increasing the switching threshold to, e.g., an ageing energy store or to changes to the PC/machine or adapt itself by way of reducing the switching threshold to, e.g., a new energy store (as a result of which the old one has been replaced) or to changes to the PC/machine. By means of continuously determining the switching threshold, which shows nothing other than a condition monitoring of the energy store or even of the PC/machine, the optimal replacement time of the energy store can be determined and communicated via a reporting system to ensure the safe powering-up and powering-down of the PC/machine.

Figure 3:
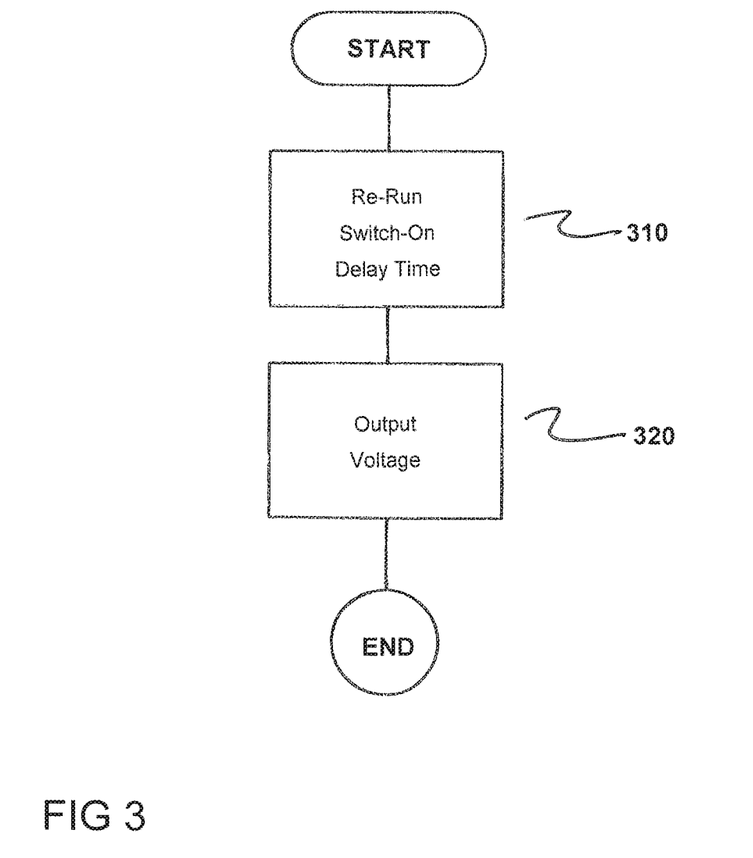
FIG. 3 is a flowchart of the method in accordance with the invention.

FIG. 3 is a flowchart of the method for operating an electrical system 10 having a plurality of electrical loads 1, 2, 3 . . . which are connected to at least one power supply unit 5 and are supplied with voltage Ua by the power supply system 10. In accordance with the invention, the at least one power supply unit 5 either connects through a basic supply voltage Ug or connects through a buffer voltage Up that is provided by an energy store unit 7 in cases of a failure of the basic supply voltage Ug, where a switch-on delay time tv is predetermined or determined in order to perform a regulated switch-on process of a least one electrical load of the plurality of electrical loads 1, 2, 3, . . . , and where either (i) the basic supply voltage Ug or (ii) a buffer voltage Up at an output of the at least one power supply unit 5 is connected through after expiration of the switch-on delay time tv.

The method comprises re-running, in an event of failure of the basic supply voltage Ug before expiration of the predetermined switch-on delay time tv, the switch-on delay time tv, beginning from an instant in time at which the basic supply voltage Ug fails and repeating the re-running the switch-on delay time tv, until one of (i) the basic supply voltage Ug is available again and (ii) after checking a charge level LN of the energy store unit 7, the buffer voltage Up is output at the output of the power supply unit 5 as an output voltage Ua as a function of the charge level LN and (iii) a charge level LN of the energy store unit 7 has reached a threshold value SW, as indicated in step 310.

Next, the output voltage Ua is output at the output of the power supply unit 5 either (i) immediately in a presence of the basic supply voltage Ug or the buffer voltage Up or (ii) only after a multiple of the switch-on delay time tv has elapsed, as indicated in step 320.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an electrical system having a plurality of electrical loads which are connected to at least one power supply unit and are supplied with voltage by said power supply system, the at least one power supply unit one of (i) connecting through a basic supply voltage and (ii) connecting through a buffer voltage which is provided by an energy store unit in cases of a failure of the basic supply voltage, an adjustable switch-on delay time being predetermined or determined in order to perform a regulated switch-on process of a least one electrical load of the plurality of electrical loads, and one of (i) the basic supply voltage and (ii) a buffer voltage at an output of the at least one power supply unit being connected through after expiration of the switch-on delay time, the method comprising:

re-running, in an event of failure of the basic supply voltage before expiration of the predetermined switch-on delay time, the adjustable switch-on delay time, beginning from an instant in time at which the basic supply voltage fails and repeating the re-running of the adjustable switch-on delay time, until one of (i) the basic supply voltage is available again, (ii) after checking a charge level of the energy store unit, the buffer voltage is output at the output of the power supply unit as an output voltage as a function of the charge level, (iii) a charge level of the energy store unit has reached a threshold value and (iv) adjusting the delay in a self-learning manner; and outputting at the output of the power supply unit the output voltage one of (i) immediately in a presence of the basic supply voltage or the buffer voltage and (ii) only after a multiple of the adjustable switch-on delay time has elapsed.

2. The method as claimed in claim 1, wherein the charge level or the threshold value is one of predetermined by a user and determined continuously.

3. The method as claimed in claim 1, wherein the power supply unit exchanges data with the plurality of electrical loads via a first communication network and with the energy store unit via a second communication network;

wherein the data comprises a selection of at least one variable selected from the group comprising voltage values, threshold values, charge level of the energy store unit, time periods and time values.

4. The method as claimed in claim 2, wherein the power supply unit exchanges data with the plurality of electrical loads via a first communication network and with the energy store unit via a second communication network;

wherein the data comprises a selection of at least one variable selected from the group comprising voltage values, threshold values, charge level of the energy store unit, time periods and time values.

5. The method as claimed in claim 1, wherein all data are one of (i) predetermined manually and (ii) with a configuration or parameterization of the power supply unit.

6. The method as claimed in claim 5, wherein the data comprises at least one of (i) the threshold value for the energy store charge level and (ii) the adjustable switch-on delay time.

7. The method as claimed in claim 1, wherein the voltage output at the output of the power supply unit is divided and provided to the plurality of electrical loads with a time delay.

8. The method as claimed in claim 1, further comprising:
determining a charging time of the energy store unit, during which the energy store unit is charged up to the threshold value of the energy store charge level.

9. A power supply unit, comprising:
at least one output for supplying a voltage to a plurality of electrical loads;
at least one first input which is connected to an output of a voltage source which supplies a basic supply voltage;
at least one second input which is connected to an output of an energy store unit which supplies a buffer voltage upon failure of the basic supply voltage;
wherein the power supply unit is configured to perform a regulated switch-on process of at least one electrical load of the plurality of electrical load to:
initiate an adjustable switch-on delay time;

re-run, in an event of failure of the basic supply voltage before expiration of a predetermined adjustable switch-on delay time, the adjustable switch-on delay time, beginning from an instant in time at which the basic supply voltage fails and repeat the re-running of the adjustable switch-on delay time, until one of (i) the basic supply voltage is available again, (ii) after checking a charge level of the energy store unit, the buffer voltage is output at the output of the power supply unit as an output voltage as a function of the charge level, (iii) a charge level of the energy store unit has reached a threshold value and (iv) adjusting the delay in a self-learning manner; and output, at the output of the power supply unit, the output voltage one of (i) immediately in a presence of the basic supply voltage or the buffer voltage and (ii) only after a multiple of the adjustable switch-on delay time has elapsed.

10. The power supply unit as claimed in claim 9, further comprising:
at least one first interface for communication and for data exchange via a first communication network with the plurality of electrical loads; and
at least one second interface for communication and for data exchange via a second communication network with the energy store unit.

11. The power supply unit as claimed in claim 9, further comprising:
a module for determining an energy store charge level of at least one of (i) the energy store unit and (ii) the charging time.

12. The power supply unit as claimed in claim 10, further comprising:
a module for determining an energy store charge level of at least one of (i) the energy store unit and (ii) the charging time.

13. The power supply unit as claimed in claim 9, further comprising:
at least one further interface for communication with one of (i) external servers (ii) control systems and (ii) via the first or second interfaces.

14. The power supply unit as claimed in claim 9, further comprising:
an engineering tool for performing engineering, configuration and parameterization of the power supply unit.

15. The power supply unit as claimed in claim 9, wherein the energy store unit comprises at least one battery module.

16. An electrically operated system with the plurality of electrical loads, said electrically operated system comprising the at least one power supply unit as claimed in claim 9.

17. The electrically operated system as claimed in claim 16, wherein at least one of (i) the power supply unit and (ii) the electrical loads comprise software modules and are configured for parameterization via a software tool.

18. A non-transitory computer readable medium encoded with a computer program having program code instructions which, when executed by a processor of a computer, causes operation of an electrical system having a plurality of electrical loads which are connected to at least one power supply unit and are supplied with voltage by said power supply system, the at least one power supply unit one of (ii) connecting through a basic supply voltage and (ii) connecting through a buffer voltage which is provided by an energy store unit in cases of a failure of the basic supply voltage, an adjustable switch-on delay time being predetermined or determined in order to perform a regulated switch-on process of a least one electrical load of the plurality of electrical loads, and one of (i) the basic supply voltage and (ii) a buffer voltage at an output of the at least one power supply unit being connected through after expiration of the adjustable switch-on delay time, the computer program comprising:

program code for re-running, in an event of failure of the basic supply voltage before expiration of the predetermined adjustable switch-on delay time, the adjustable switch-on delay time, beginning from an instant in time at which the basic supply voltage fails and repeating the re-running of the adjustable switch-on delay time, until one of (i) the basic supply voltage is available again, (ii) after checking a charge level of the energy store unit, the buffer voltage is output at the output of the power supply unit as an output voltage as a function of the charge level, (iii) a charge level of the energy store unit has reached a threshold value and (iv) adjusting the delay in a self-learning manner; and     program code for outputting at the output of the power supply unit the output voltage one of (i) immediately in a presence of the basic supply voltage or the buffer voltage and (ii) only after a multiple of the adjustable switch-on delay time has elapsed.

\* \* \* \* \*